(12) United States Patent
Carter et al.

(10) Patent No.: US 7,594,481 B2
(45) Date of Patent: Sep. 29, 2009

(54) CAROUSEL ANIMAL CAGING SYSTEM WITH A CENTRALIZED WATER SUPPLY AND VENTILATION PLENUM

(75) Inventors: James S. Carter, Denver, CO (US); Stieg E. Corell, Highlands Ranch, CO (US)

(73) Assignee: Animal Care Systems, Inc., Littleton, CO (US)

( * ) Notice: Subject to any disclaimer, the term of this patent is extended or adjusted under 35 U.S.C. 154(b) by 807 days.

(21) Appl. No.: 11/248,920

(22) Filed: Oct. 11, 2005

(65) Prior Publication Data

US 2007/0079765 A1    Apr. 12, 2007

(51) Int. Cl.
   *A01K 31/00* (2006.01)
(52) U.S. Cl. .................................. 119/456; 119/418
(58) Field of Classification Search ................ 119/456, 119/457, 475, 417–419, 455
   See application file for complete search history.

(56) References Cited

U.S. PATENT DOCUMENTS

| | | | |
|---|---|---|---|
| 796,579 A | 8/1905 | Jessop | |
| 3,302,615 A | 2/1967 | Tietje | |
| 3,557,756 A | 1/1971 | Ramsey | |
| 3,877,420 A | 4/1975 | Eagleson, Jr. | |
| 3,924,571 A | 12/1975 | Holman | |
| 4,343,261 A | 8/1982 | Thomas | |
| 4,365,590 A | 12/1982 | Ruggieri et al. | |
| 4,448,150 A | 5/1984 | Catsimpoolas | |
| 4,699,088 A * | 10/1987 | Murray et al. | 119/419 |
| 4,844,018 A * | 7/1989 | Niki | 119/72.5 |
| 4,989,545 A | 2/1991 | Sheaffer et al. | |
| 5,000,120 A * | 3/1991 | Coiro et al. | 119/419 |
| 5,042,429 A * | 8/1991 | Deitrich et al. | 119/419 |
| 5,076,210 A | 12/1991 | Horn | |
| 5,307,757 A * | 5/1994 | Coiro et al. | 119/418 |
| 5,337,696 A * | 8/1994 | Edstrom et al. | 119/456 |
| 5,513,596 A * | 5/1996 | Coiro et al. | 119/457 |
| 5,823,144 A * | 10/1998 | Edstrom et al. | 119/475 |
| 5,924,384 A | 7/1999 | Deitrich et al. | |
| 5,996,535 A | 12/1999 | Semenuk et al. | |
| 6,158,387 A | 12/2000 | Gabriel et al. | |
| 6,257,171 B1 | 7/2001 | Rivard | |
| 6,457,437 B1 | 10/2002 | Frasier et al. | |
| 6,571,738 B2 | 6/2003 | Rivard | |
| 6,584,936 B2 | 7/2003 | Rivard | |
| 2002/0043217 A1 | 4/2002 | Rivard | |
| 2003/0051676 A1 | 3/2003 | Rivard | |

* cited by examiner

*Primary Examiner*—Kimberly S Smith
(74) *Attorney, Agent, or Firm*—Dorr, Carson & Birney, P.C.

(57) ABSTRACT

An animal caging system has a plurality of stackable support trays with integral water supply conduits to supply water sequentially to each cage and eliminate any channels of stagnant water. Each support tray includes a vertical support member that engages the vertical support members of adjacent support trays in a stacked relationship, and a number of cage docking stations arranged around the vertical support member. The vertical support member includes a water supply conduit that extends to each cage docking station of the support tray and has openings in fluid communication with corresponding openings in the water supply conduits of adjacent support trays. In this manner, the water supply conduits of the stacked vertical support members combine to supply water in a single flow path to the cage docking stations on each support tray.

21 Claims, 11 Drawing Sheets

CAROUSEL ANIMAL CAGING SYSTEM WITH A CENTRALIZED WATER SUPPLY AND VENTILATION PLENUM

BACKGROUND OF THE INVENTION

1. Field of the Invention

The present invention relates generally to the field of animal caging systems. More specifically, the present invention discloses a carousel animal caging system with a centralized water supply serving each cage.

2. Statement of the Problem

Caging systems have long been used in laboratories and research facilities to hold laboratory animals, such rats and mice. Such facilities often must house large numbers of laboratory animals in a relatively limited amount of space, which creates a need for adequate ventilation through all of the cages.

The animals in each cage must also be supplied with water and food on a regular basis. Many conventional laboratory caging systems employ separate water bottles for each cage. This requires personnel to periodically check and refill each water bottle. Therefore a need exists for a centralized watering system to automatically dispense water to each cage.

In addition, a modular design is advantageous in being able to configure the caging systems to meet the specific needs of research facilities on a customized basis. A modular design also simplifies disassembly of the caging system for cleaning or maintenance.

Finally, a centralized water supply system must be periodically emptied and flushed to prevent the growth of microorganisms in the standing water in the system. This process is made simpler and more effective if the entire water supply system is a single flow path without significant branches that could trap water or not be well flushed. Therefore, it is advantageous to design a centralized water supply system with a single flow path.

The prior art in the field of animal caging systems includes the following:

| Inventor | U. S. Pat. No. | Issue Date |
| --- | --- | --- |
| Eagleson | 3,877,420 | Apr. 15, 1975 |
| Holman | 3,924,571 | Dec. 9, 1975 |
| Thomas | 4,343,261 | Aug. 10, 1982 |
| Ruggieri et al. | 4,365,590 | Dec. 28, 1982 |
| Catsimpoolas | 4,448,150 | May 15, 1984 |
| Sheaffer et al. | 4,989,545 | Feb. 5, 1991 |
| Semenuk et al. | 5,996,535 | Dec. 7, 1999 |
| Gabriel et al. | 6,158,387 | Dec. 12, 2000 |
| Rivard | 6,257,171 | Jul. 10, 2001 |
| Frasier et al. | 6,457,437 | Oct. 1, 2002 |
| Rivard | 6,571,738 | Jun. 3, 2003 |
| Rivard | 6,584,936 | Jul. 1, 2003 |

Eagleson discloses an animal housing system having a carousel that holds a number of wedge-shaped cages. The cages are ventilated by a downward laminar air flow through a housing assembly.

Catsimpoolas discloses an animal caging system with an inner carousel that holds a number of wedge-shaped cages. Each cage is removable from the cage support structure. The central core draws fresh air through the cages via cage wall perforations. An outer partial ring of animal activity stations can be used for animal weighing, feeding or experimentation.

Holman, Ruggieri et al. and Semenuk et al. disclose examples of cage and rack systems that include ventilation and a water supply to each cage.

Thomas, Sheaffer et al., Gabriel et al. and Frasier et al. disclose other examples of ventilated cage and rack systems.

The Rivard patents disclose an animal caging system in which each cage has a separate water storage container.

Solution to the Problem. None of the prior art references discussed above show an animal caging system having a plurality of stackable support trays with integral water supply conduits to supply water to each cage. Optionally, the vertical support members of each support tray form a central plenum that can also be used for ventilation. This approach addresses the shortcoming of the prior art, as discussed above, by using a modular design to provide a centralized water supply and ventilation for each cage. In addition, the water supply can be formed as a single conduit through all of the stacked support trays to simplify draining and flushing the system.

SUMMARY OF THE INVENTION

This invention provides an animal caging system having a plurality of stackable support trays with integral water supply conduits to supply water to each cage. Each support tray includes a vertical support member that engages the vertical support members of adjacent support trays in a stacked relationship, and a number of cage docking stations arranged around the vertical support member. The vertical support member includes a water supply conduit that extends to each cage docking station of the support tray and has openings in fluid communication with corresponding openings in the water supply conduits of adjacent support trays. In this manner, the water supply conduits of the stacked vertical support members combine to supply water to cage docking stations on each support tray.

These and other advantages, features, and objects of the present invention will be more readily understood in view of the following detailed description and the drawings.

BRIEF DESCRIPTION OF THE DRAWINGS

The present invention can be more readily understood in conjunction with the accompanying drawings, in which.

DETAILED DESCRIPTION OF THE INVENTION

Figure 1:
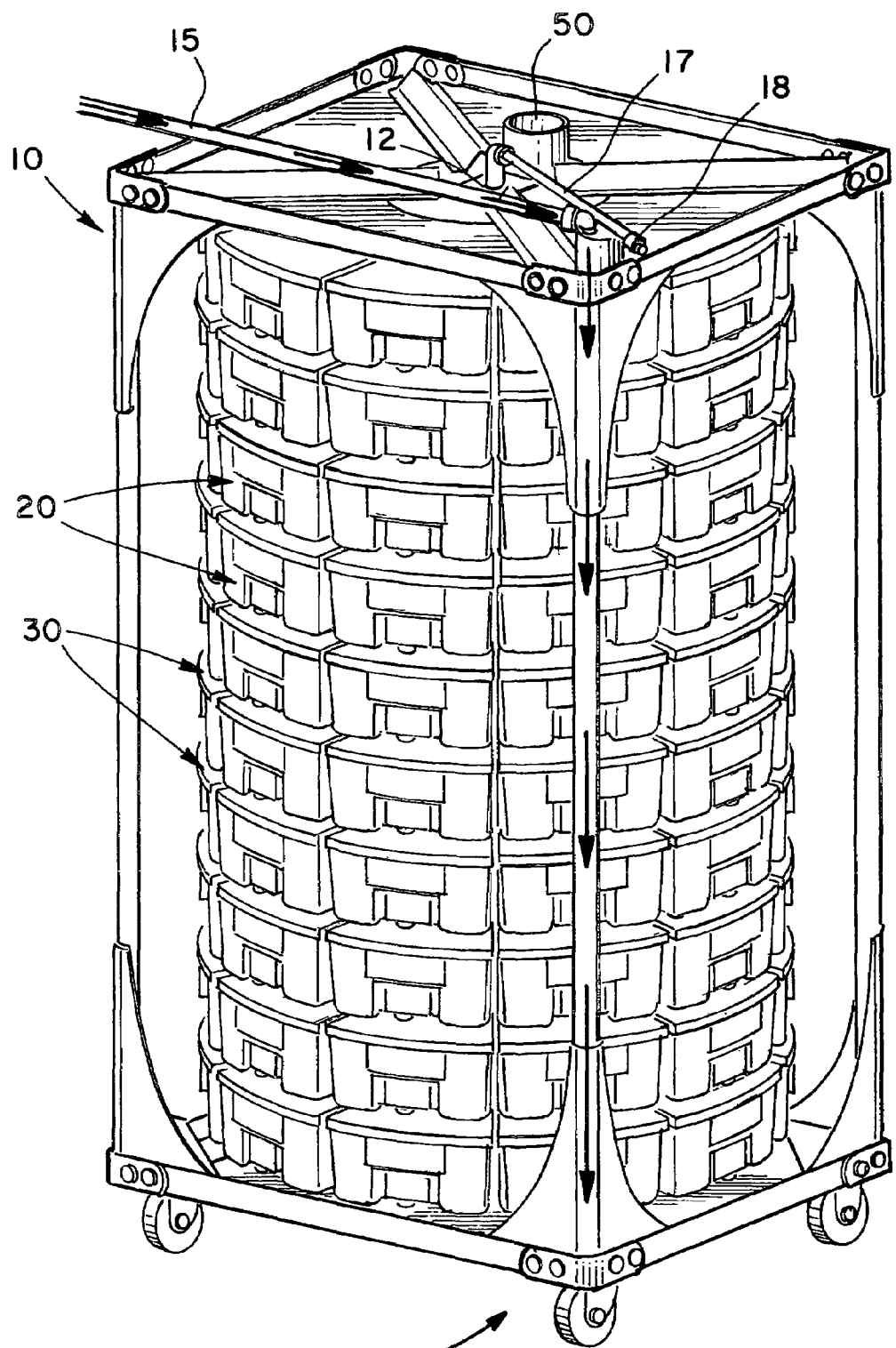
FIG. 1 is a front perspective view of an assembled animal caging system implementing the present invention.
Figure 3:
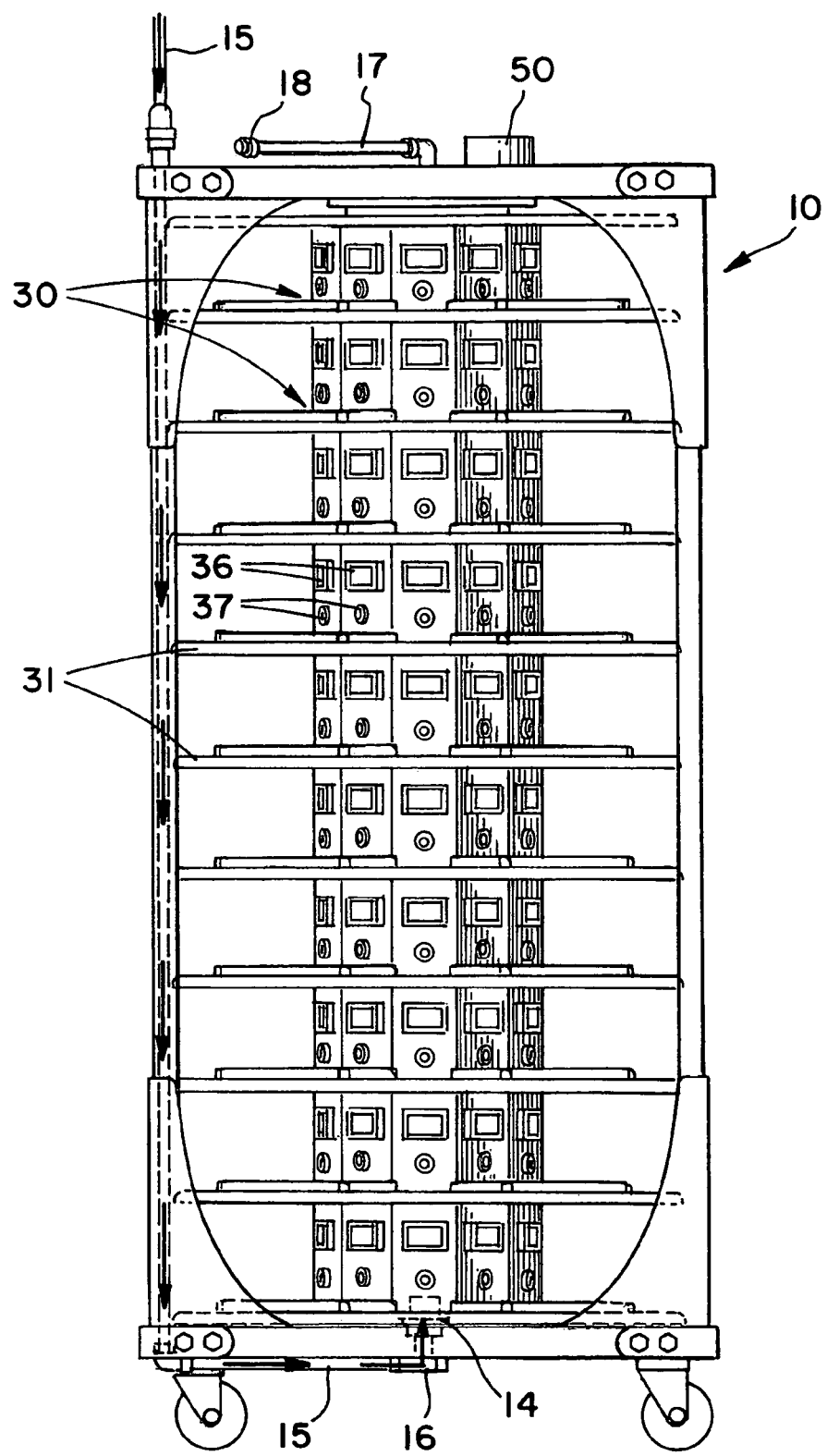
FIG. 3 is a front plan view of the animal caging system corresponding to FIG. 1 without cages.

Turning to FIG. 1, a front perspective view is provided of an assembled animal caging system implementing the present invention. The primary components of the assembly include a support frame 10 and a plurality of stackable support trays 30, each of which can hold a number of removable animal cages 20. FIG. 3 is a front plan view of the animal caging system corresponding to FIG. 1 without cages.

Figure 4:
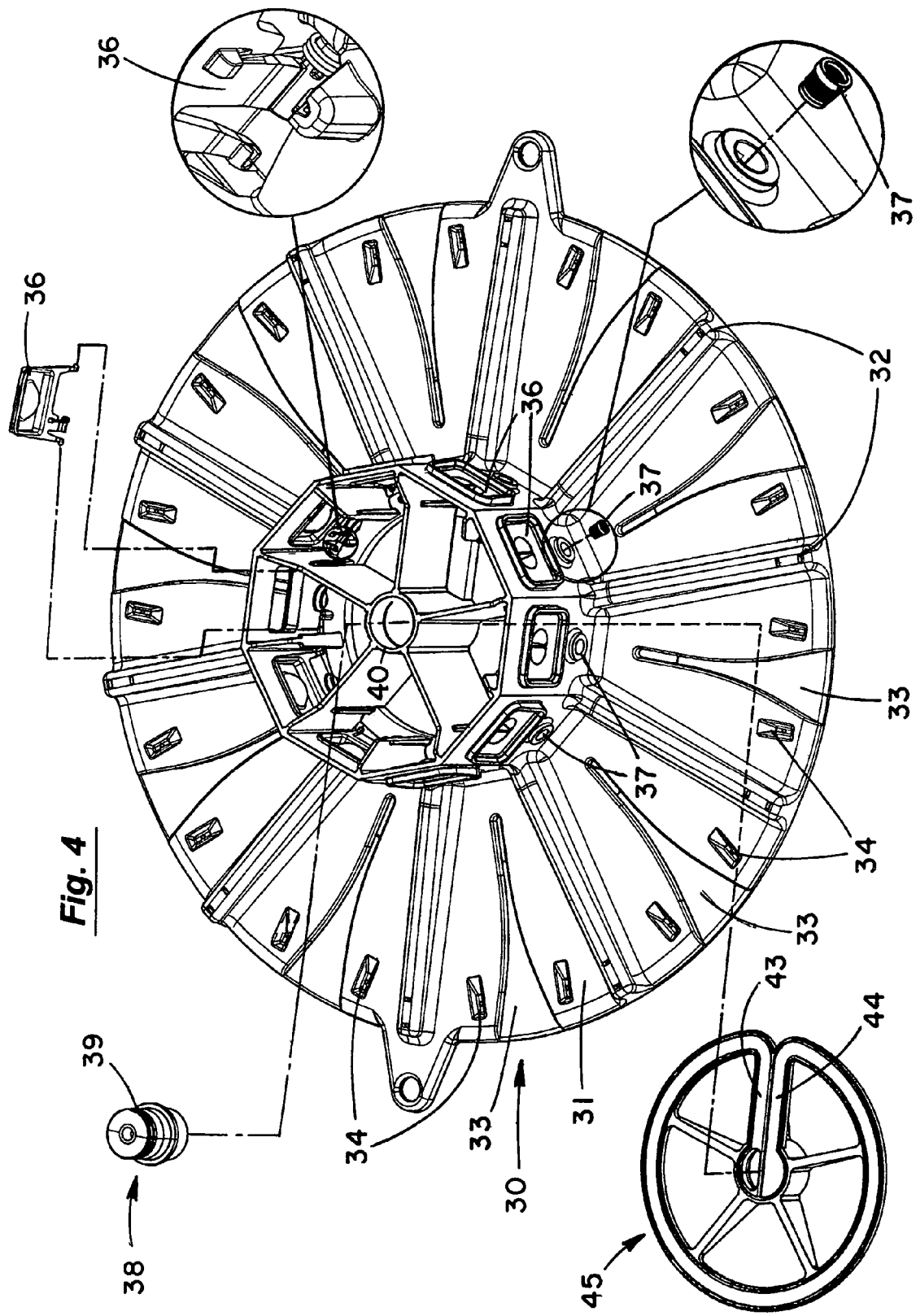
FIG. 4 is a top perspective view of a support tray.
Figure 5:
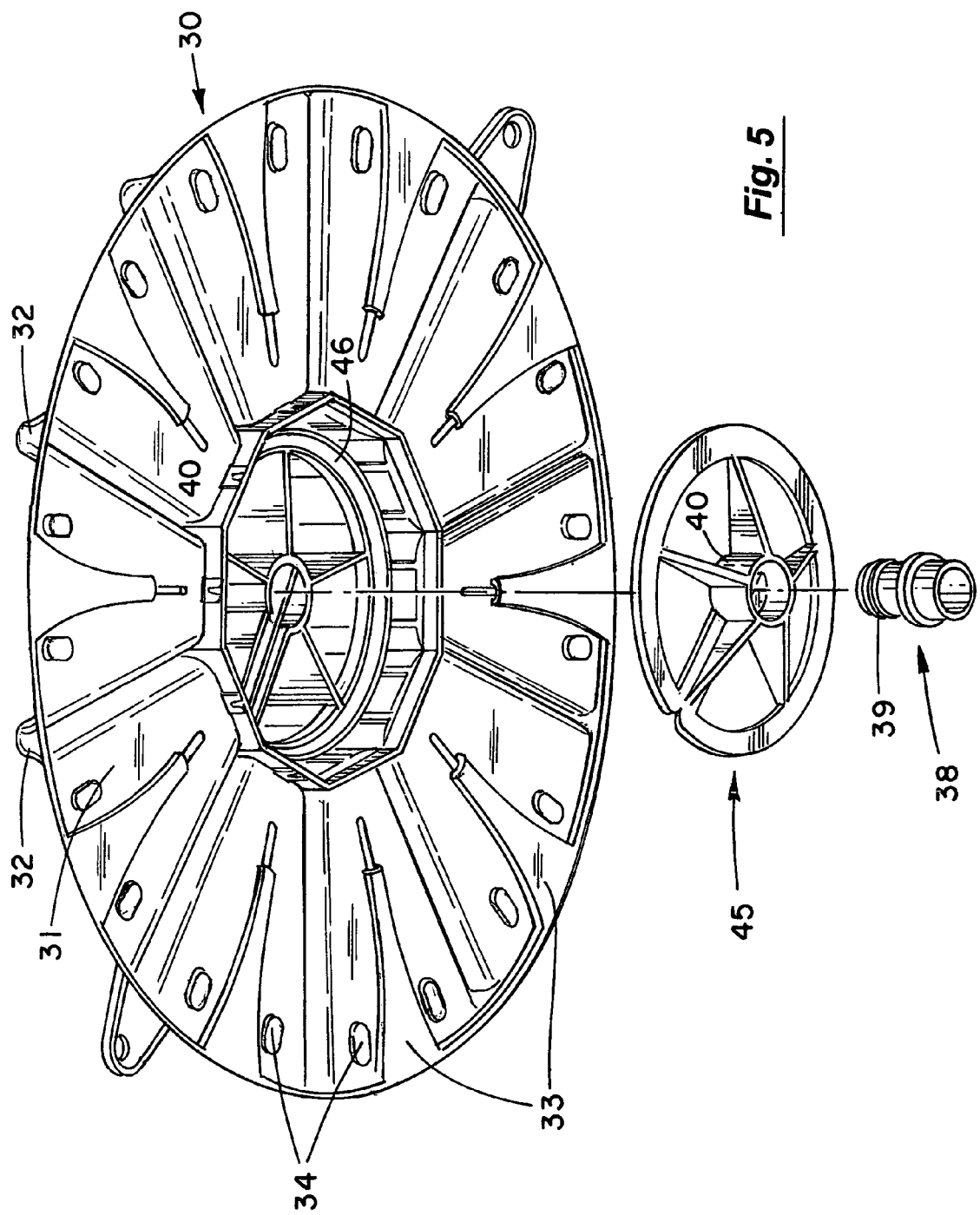
FIG. 5 is an exploded bottom perspective view of a support tray 30, including its ring structure 45 and a tubular connector 38.

The details of a support tray 30 are depicted beginning with FIGS. 4 and 5. In particular, FIG. 4 is a top perspective view of a support tray 30. Each support tray 30 includes a vertical support member 40 that is designed to engage the vertical support members of adjacent support trays in a stacked relationship. For example, in the embodiment shown in FIGS. 4, 5 and 7, a tubular connector 38 with O-rings 39 is inserted between adjacent vertical support members 40 to create a vertical stack of support trays 30. Alternatively, the upper and lower ends of the vertical support members 40 could be formed to directly engage one another (e.g., by insertion or threads).

In the embodiment shown in the drawings, each support tray 30 has a generally-circular platter 31 surrounding the vertical support member 40 to receive and support a number of cages 20. The platter 31 provides a plurality of docking stations for animal cages 20 arranged in a radial pattern about the vertical support member 40. Each docking station includes a set of alignment guides (e.g., ridges 32 and guide slots 33) to help ensure proper alignment of the cage 20 as it is inserted into the docking station. The docking stations can be equipped with a number of stops 34 to help register the cage 20 in proper position relative to the docking station, and also to help prevent the cage 20 from becoming accidentally dislodged from the docking station.

Figure 6:
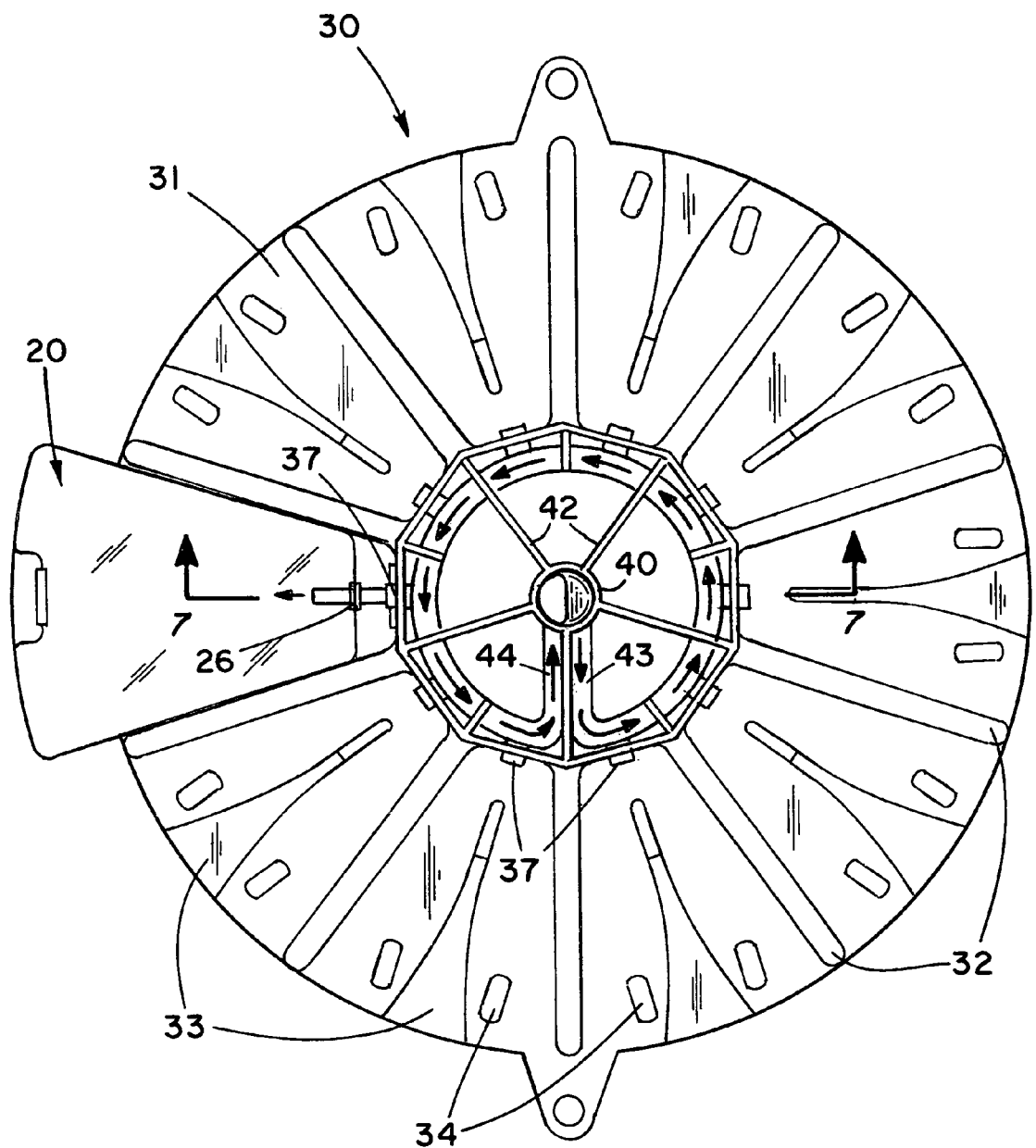
FIG. 6 is a top view of a support tray 30 and a cage 20.

Preferably, the cages 20 are generally wedge-shaped to slide easily along the alignment guides 32, 33 at a docking station, and to maximize effective use of the available space on the circular support tray 30. FIG. 6 is a top view of a support tray 30 with a cage 20 inserted at one of its docking stations. However, a wide variety of configurations and shapes could be readily substituted for the support trays and cages. The embodiment shown in the drawings employs a single stack of vertical support members 40, which enables the entire assembly to rotate like a carousel about a vertical axis. Alternatively, multiple stacks of vertical support members could be used for additional structural strength.

The vertical support member 40 of each support tray 30 has a water supply conduit extending to each docking station. Each vertical support member 40 has upper and lower openings in fluid communication with corresponding openings in the water supply conduits of the vertical support members of adjacent support trays. The O-rings 39 of the tubular connectors 38 provide a water-tight seal between each pair of adjacent vertical support members 40. The bottom inlet end of each vertical support member 40 seats with the upper end of the tubular connector 38 extending upward from the next support tray below. Similarly, the upper outlet end of the each vertical support member 40 seats with the lower end of the tubular connector 38 leading to the next support tray above. Thus, the water supply conduits of the stacked vertical support members 40 combine in series to form one, continuous conduit through the entire assembly supply water for distributing water to all of the cage docking stations on all of the stacked support trays.

Figure 8:
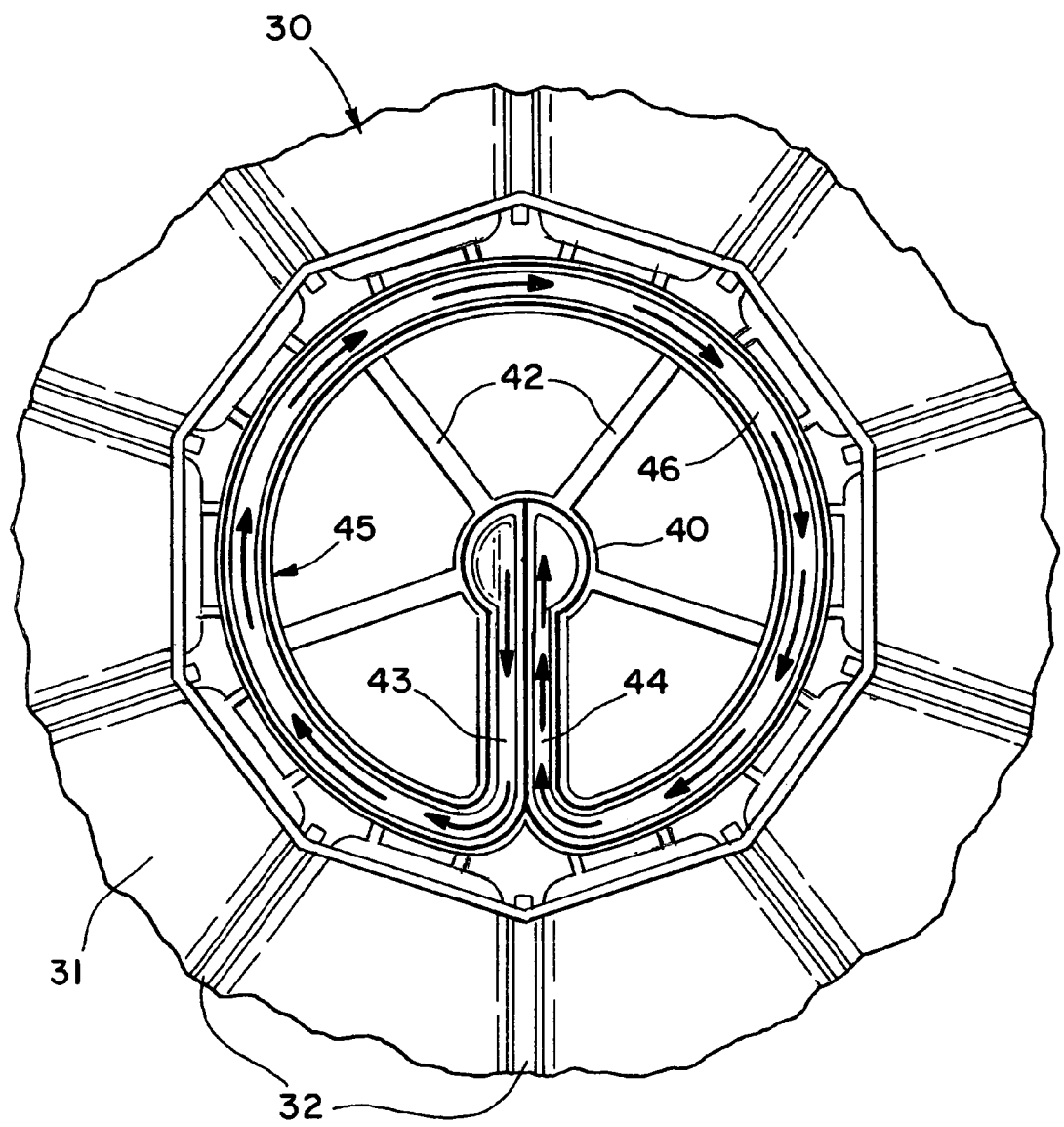
FIG. 8 is a bottom view of the central portion of a support tray 30 with the ring structure 45 shown in cross-section.
Figure 10:
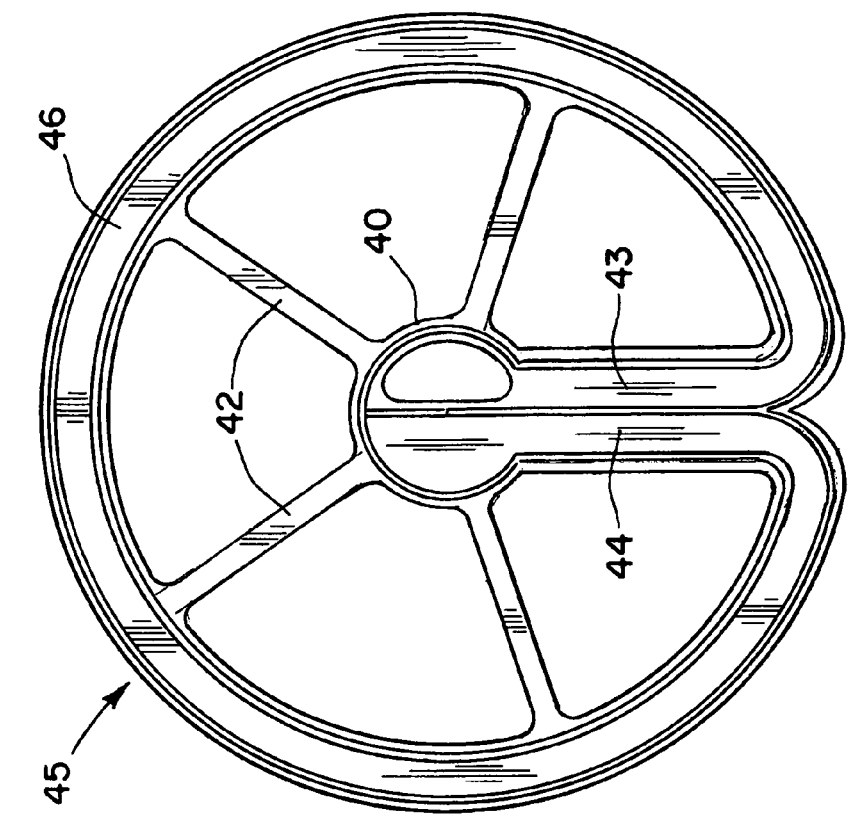
FIG. 10 is a top view of the ring structure 45.
Figure 9:
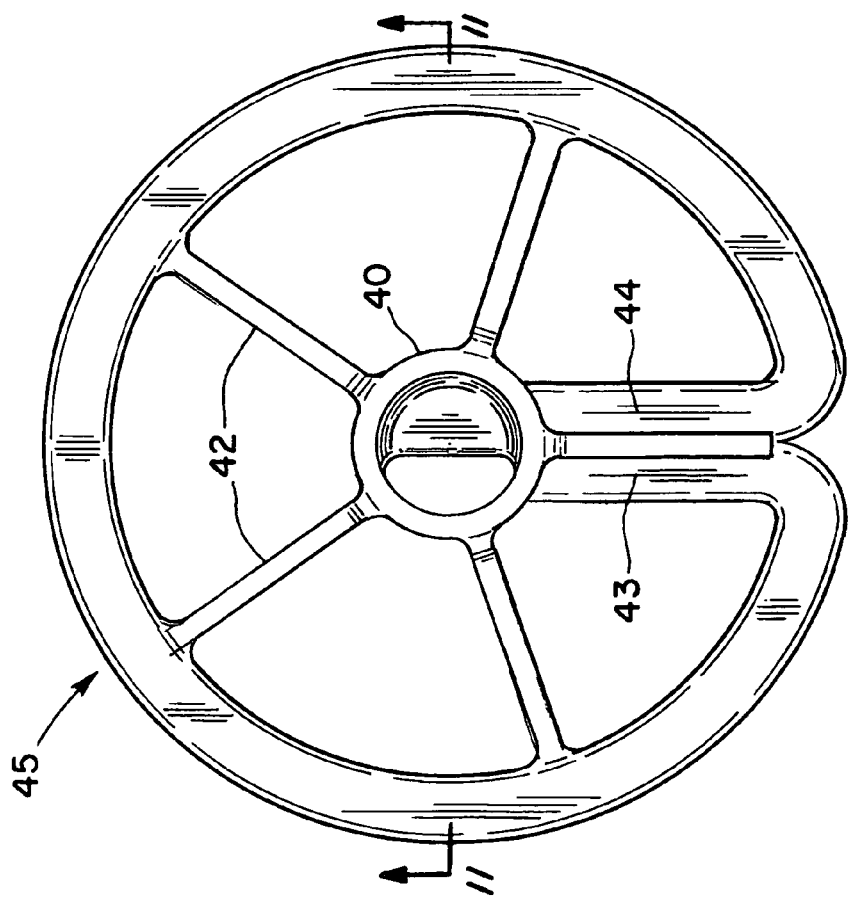
FIG. 9 is a bottom view of the ring structure 45.
Figure 11:
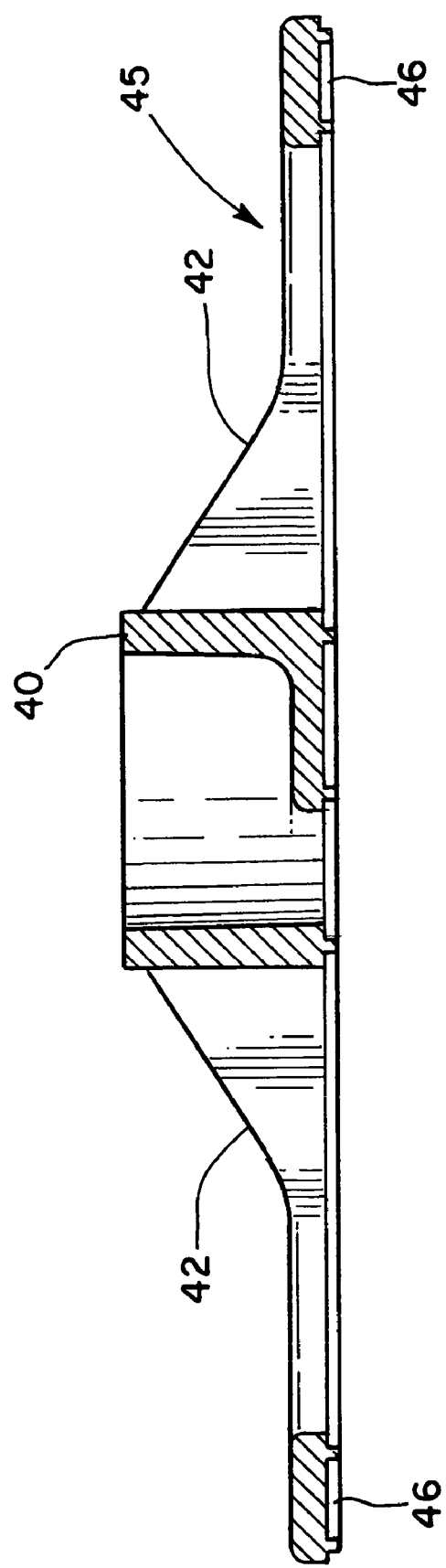
FIG. 11 is a cross-sectional side view of the ring structure 45.

In the particular embodiment shown in the drawings, each support tray 30 has a ring structure 45 surrounding its vertical support member 40. FIG. 5 is an exploded bottom perspective view of a support tray 30, including its ring structure 45 and a tubular connector 38. The ring structure 45 can be bonded to the bottom of the remainder of the support tray 30 to define the water conduits discussed below. The vertical support member 40 for the support tray 30 essentially serves as the hub of the ring structure 45 after assembly. FIG. 8 is a bottom view of the central portion of a support tray 30 with the ring structure 45 shown in cross-section. FIG. 9 is a bottom view of the ring structure 45. FIG. 10 is a top view and FIG. 11 is a cross-sectional side view of the ring structure 45. This ring structure 45 passes adjacent to each of the docking stations on the support tray 30 and contains a water conduit 46 for distributing water to each docking station on the support tray 30.

A set of spokes 42 extend radially outward from the vertical support member 40 to the ring structure 45. The spokes 42 support the ring structure 45, the remainder of the support tray, and the cages 20 relative to the vertical support member 40. In addition to providing structural support, the spokes 42 can also be used to distribute water from the water supply conduit in the vertical support member 40 to the water conduit 46 in the ring structure 45. As shown in FIGS. 6 and 8, one of the spokes 42 can be used to carry a water supply conduit 43 and a water return conduit 44 connecting the water conduit in the vertical support member 40 to the water conduit 46 in the ring structure 45.

Thus, the water conduits 43, 46, and 44 of the vertical support member 40, spoke 42, and ring structure 45 combine in series to form one, continuous conduit to supply water to all of the cages 20 on the support tray 30. Within each support tray 30, water initially flows from an adjacent support tray into the opening of the water supply conduit of the vertical support member 40 and then passes through the water supply conduit 43 in one of the spokes 42 to connect with the water conduit 46 in the ring structure 45. The water flowing through the ring structure is available at taps 37 at each docking station for the cages 20. FIG. 4 includes a detail perspective view of the watering tap 37 at a typical docking station. The remaining water continues around the ring structure 45 and returns to the vertical support member 40 via the water return conduit 44 in one of the spokes 42. This arrangement has the advantage of providing essentially a single flow path for water through each support tray 30 and through the entire assembly. This greatly simplifies draining and flushing the assembly. However, it should be understood that other alternative embodiments of the water conduit could be readily substituted.

Optionally, the present invention can also be used to ventilate the cages 20. In this embodiment, the generally annular region surrounding the vertical support members 40 and within the vertical walls and ring structures 45 of the stacked support trays 30 serves as a central ventilation plenum 50 for the entire assembly. Each docking station is equipped with a ventilation opening into the central ventilation plenum 50. Ventilation can either be powered by a fan (not shown) or drawn by natural convection through the cages. It is important to maintain negative pressure within the ventilation plenum 50 so that ventilation air will be drawn through all of the docked cages 20 if a fan is employed. To address this concern, each docking station is equipped with a ventilation door 36 that is pushed open by a cage 20 as it is inserted into the docking station. FIG. 4 includes a detail perspective view of a ventilation door 36. The ventilation door 36 is spring-loaded to remain closed if the docking station is unoccupied to minimize unnecessary leakage of air into the ventilation plenum.

Figure 7:
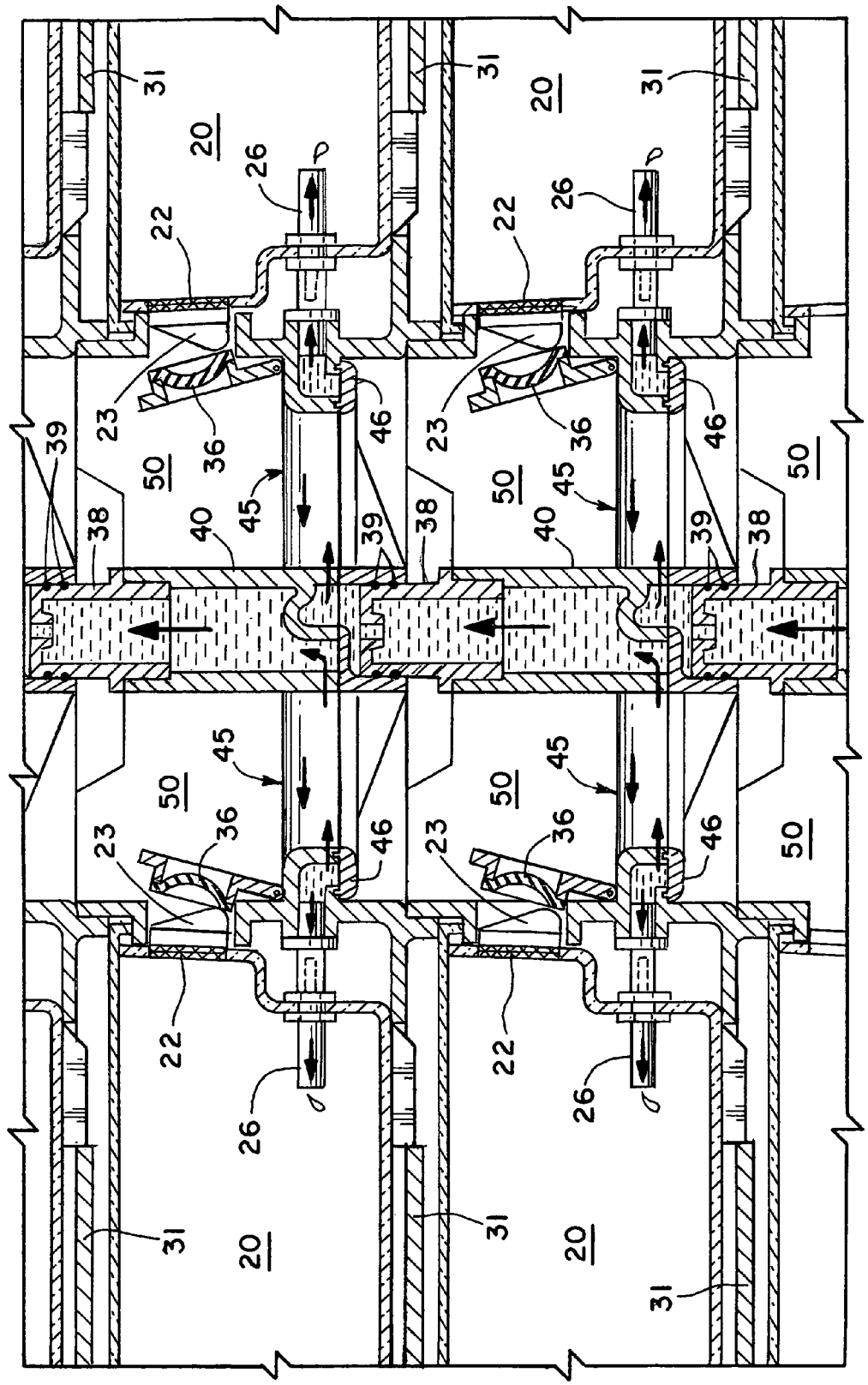
FIG. 7 is a detail vertical cross-sectional view of several support trays and cages.
Figure 12:
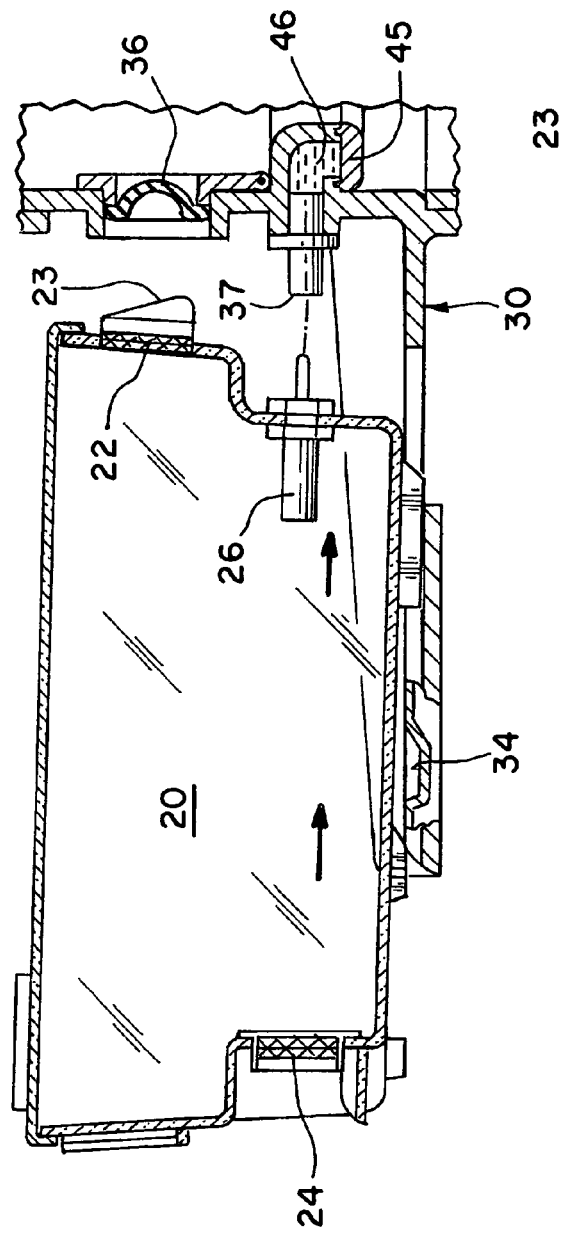
FIG. 12 is a cross-sectional side view of a cage 20 entering a docking station on a support tray 30.
Figure 13:
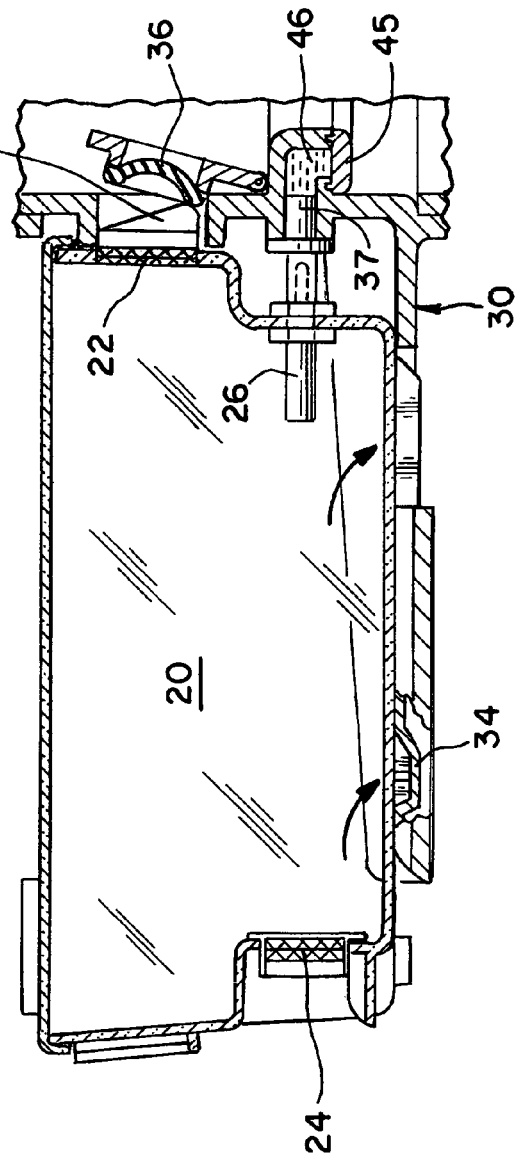
FIG. 13 is a cross-sectional side view corresponding to the FIG. 12 after the cage 20 has engaged the docking station of the support tray 30.

Each animal cage 20 includes a front ventilation port 24 and a rear ventilation port 22 to allow the flow of air through the cage 20. For example, the cage 20 can also include a number of tabs 23 projecting outward adjacent to the rear ventilation port 22 to push open the ventilation door 36 when the cage 20 is inserted into a docking station. FIG. 12 is a cross-sectional side view of a cage 20 entering a docking station. FIG. 13 is a cross-sectional side view after the cage 20 has engaged the docking station of the support tray. Each cage 20 also includes a watering port 26 to receive a water tap 37 extending outward from the docking station. FIG. 7 is a detail vertical cross-sectional view of cages on several support trays showing both the watering port 26 and ventilation port 22.

Figure 2:
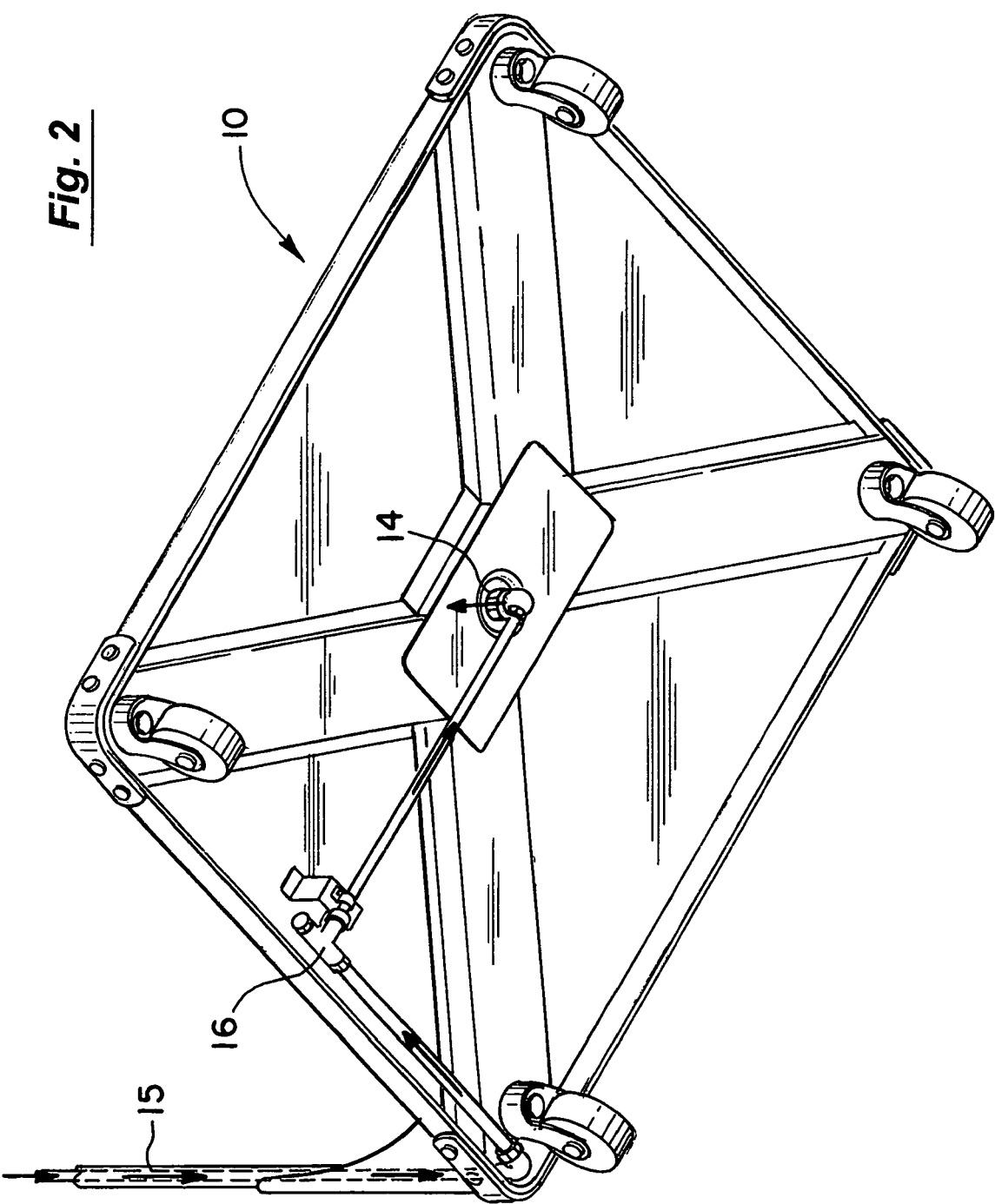
FIG. 2 is a detail bottom perspective view of a portion of the bottom of the animal caging system.

A support frame 10 provides structural support for the stacked assembly of support trays 30 as shown in FIGS. 1 through 3. The support frame 10 is generally an open framework to provide ready access to the cages 20 stored on the stacked support trays 30. Wheels can be attached to the base of the support frame 10 to make the unit portable. The support frame 10 includes top and bottom pivots 12 and 14 that enable the support trays 30 and cages 20 to rotate about a vertical axis. These pivots 12, 14 engage the tubular connectors 38 to allow rotation of the support tray assembly, and also provide a water-tight connections between external water lines and the water conduits of the stacked vertical support members 40. For example, FIG. 2 is a detail bottom perspective view of the bottom of the support frame 10 showing of a water supply line 15 leading to the bottom pivot 14. Similarly, a water drain line 17 is connected to the top pivot, as shown in FIG. 1. During cleaning, the water supply line can be shut off, and a drain valve 16 in the water supply line 15 can be opened to drain water from the entire assembly. A bleeder valve 18 in the water drain line 17 at the top of the assembly can be used to bleed air during filling, or to allow air into the water conduits to ensure complete draining prior to cleaning.

The above disclosure sets forth a number of embodiments of the present invention described in detail with respect to the accompanying drawings. Those skilled in this art will appreciate that various changes, modifications, other structural arrangements, and other embodiments could be practiced under the teachings of the present invention without departing from the scope of this invention as set forth in the following claims.

We claim:

1. An animal caging system comprising:
   a plurality of animal cages;
   a plurality of stackable support trays, each having:
   (a) a vertical support member to engage the vertical support members of adjacent support trays in a stacked relationship; and
   (b) a plurality of cage docking stations arranged around the vertical support member to receive animal cages; and
   (c) a water supply conduit extending from the vertical support member to each cage docking station of the support tray and having openings in fluid communication with corresponding openings in the water supply conduits of the vertical support members of adjacent support trays, whereby the water supply conduits of the stacked vertical support members combine to supply water to the cage docking stations on each support; and
   a ventilation plenum surrounding the stacked vertical support members and providing ventilation through the cage docking stations to the animal cages.

2. The animal caging system of claim 1 wherein at least one of the support trays further comprises:
   a ring structure surrounding the ventilation plenum and adjacent to the cage docking stations; and
   a plurality of spokes extending radially outward from the vertical support member through the ventilation plenum to the ring structure;
   wherein the water supply conduit extends from the vertical support member along one of the spokes, around the ring structure to each cage docking station, and returns to the vertical support member along one of the spokes.

3. The animal caging system of claim 1 wherein the support trays rotate about the stacked vertical support members, and the cage docking stations are arranged in a radial pattern about the stacked vertical support members.

4. The animal caging system of claim 3 wherein the animal cages are wedge-shaped.

5. The animal caging system of claim 1 wherein the water supply conduit of each support tray provides connections to each cage docking station in series and the water supply conduits of the support trays are connected in series, thereby creating a single continuous flow path through the entire animal caging system.

6. The animal caging system of claim 1 wherein the animal cages are removable from the cage docking stations.

7. The animal caging system of claim 1 wherein the support tray further comprises alignment guides to direct the animal cages into the cage docking stations.

8. An animal caging system comprising:
   a plurality of animal cages;
   a plurality of stackable support trays, each having:
   (a) a vertical support member to engage the vertical support members of adjacent support trays in a stacked relationship;
   (b) a plurality of cage docking stations arranged in a pattern around the vertical support member to removably receive animal cages; and
   (c) a water supply conduit extending from a first opening sealed in fluid communication with an opening of a first adjacent vertical support member to each cage docking station of the support tray in series, and continuing to a second opening sealed in fluid communication with an opening of a second adjacent vertical support member, whereby the water supply conduits of the stacked vertical support members are connected in series to create a single continuous flow path through the entire animal caging system; and
   a ventilation plenum surrounding the stacked vertical support members and providing ventilation through the cage docking stations to the animal cages.

9. The animal caging system of claim 8 wherein at least one of the support trays further comprises:
   a ring structure surrounding the ventilation plenum and adjacent to the cage docking stations; and
   a plurality of spokes extending radially outward from the vertical support member through the ventilation plenum to the ring structure;
   wherein the water supply conduit extends from the vertical support member along one of the spokes, around the ring structure to each cage docking station, and returns to the vertical support member along one of the spokes.

10. The animal caging system of claim 8 wherein the support trays rotate about the stacked vertical support members, and the cage docking stations are arranged in a radial pattern about the stacked vertical support members.

11. An animal caging system comprising:
   a plurality of animal cages; and a plurality of stackable support trays, each having:

(a) a vertical support member to engage the vertical support members of adjacent support trays in a stacked relationship;

(b) a plurality of cage docking stations arranged in a radial pattern around the vertical support member to removably receive animal cages;

(c) a ring structure surrounding the vertical support member and adjacent to the cage docking stations; and (d) a water supply conduit extending from the vertical support member and through the ring structure to the cage docking stations of the support tray, and having openings in fluid communication with corresponding openings in the water supply conduits of the vertical support members of adjacent support trays, whereby the water supply conduits of the stacked vertical support members combine to supply water to the cage docking stations on each support tray.

12. The animal caging system of claim 11 further comprising a ventilation plenum surrounding the stacked vertical support members and providing ventilation through the cage docking stations to the animal cages.

13. The animal caging system of claim 12 wherein the ring structure surrounds the ventilation plenum, and the support tray further comprises a plurality of spokes extending radially outward from the vertical support member through the ventilation plenum to the ring structure.

14. The animal caging system of claim 11 wherein the support trays rotate about the stacked vertical support members.

15. The animal caging system of claim 11 wherein the animal cages are wedge-shaped.

16. The animal caging system of claim 11 wherein the support tray further comprises alignment guides to direct the animal cages into the cage docking stations.

17. An animal caging system comprising:

a plurality of animal cages, each having a ventilation port and a watering port; and a plurality of stackable support trays, each having:

(a) a vertical support member to engage the vertical support members of adjacent support trays in a stacked relationship;

(b) a ventilation plenum formed by the stacked support trays and surrounding the stacked vertical support members;

(c) a plurality of cage docking stations arranged in a radial pattern around the ventilation plenum to removably receive animal cages, each cage docking station having an opening to connect the ventilation port of an animal cage to the ventilation plenum;

(d) a ring structure surrounding the ventilation plenum adjacent to the cage docking stations; and (e) a water supply conduit extending from the vertical support member and through the ring structure to the watering ports of animal cages in the cage docking stations of the support tray) and having openings in fluid communication with corresponding openings in the water supply conduits of the vertical support members of adjacent support trays) whereby the water supply conduits of the stacked vertical support members combine to supply water to the cage docking stations on each support tray.

18. The animal caging system of claim 17 wherein the support tray further comprises a plurality of spokes extending radially outward from the vertical support member through the ventilation plenum to the ring structure.

19. The animal caging system of claim 17 wherein the support trays rotate about the stacked vertical support members.

20. The animal caging system of claim 17 wherein the support tray further comprises alignment guides to direct the animal cages into the cage docking stations.

21. The animal caging system of claim 17 wherein the water supply conduit of each support tray provides connections to each cage docking station in series and the water supply conduits of the support trays are connected in series, thereby creating a single continuous flow path through the entire animal caging system.

* * * * *